United States Patent
Boland (10) Patent No.: US 9,358,957 B2
(45) Date of Patent: Jun. 7, 2016

(54) WINDSCREEN WIPER DEVICE

(75) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 134 days.

(21) Appl. No.: 13/504,610

(22) PCT Filed: Oct. 28, 2009

(86) PCT No.: PCT/EP2009/064184
§ 371 (c)(1),
(2), (4) Date: Jun. 28, 2012

(87) PCT Pub. No.: WO2011/050836
PCT Pub. Date: May 5, 2011

(65) Prior Publication Data
US 2012/0260451 A1    Oct. 18, 2012

(51) Int. Cl.
*B60S 1/40*    (2006.01)
*B60S 1/38*    (2006.01)

(52) U.S. Cl.
CPC ............... *B60S 1/3863* (2013.01); *B60S 1/40* (2013.01); *B60S 1/4009* (2013.01); *B60S 1/4019* (2013.01); *B60S 1/3867* (2013.01); *B60S 2001/409* (2013.01)

(58) Field of Classification Search
CPC ........ B60S 1/40; B60S 1/4006; B60S 1/4009; B60S 1/4045; B60S 1/3849; B60S 2001/409; B60S 2001/4093; B60S 2001/4012; B60S 1/3868; B60S 1/3867; B60S 1/4064
USPC ............. 15/250.32, 250.43, 250.44, 250.361, 15/250.201
See application file for complete search history.

(56) References Cited

U.S. PATENT DOCUMENTS

| | | | | |
|---|---|---|---|---|
| 3,899,800 A | * | 8/1975 | Wittwer et al. | 15/250.44 |
| 4,852,206 A | * | 8/1989 | Fisher | 15/250.201 |
| 6,353,962 B1 | * | 3/2002 | Matsumoto et al. | 15/250.32 |
| 6,718,594 B1 | | 4/2004 | Kotlarski | |
| 8,307,492 B2 | * | 11/2012 | Espinasse | 15/250.32 |
| 2005/0262653 A1 | | 12/2005 | Verelst et al. | |
| 2008/0201892 A1 | * | 8/2008 | Fujiwara et al. | 15/250.32 |

FOREIGN PATENT DOCUMENTS

| | | | |
|---|---|---|---|
| DE | 202005020549 | | 4/2006 |
| DE | 1020080400761 | * | 1/2010 |
| EP | 1403156 A1 | | 3/2004 |
| FR | 2838693 | * | 10/2003 |
| FR | 2879987 A1 | | 6/2006 |
| JP | 2001122084 A | | 5/2001 |
| JP | 2003205827 A | | 7/2003 |

(Continued)

*Primary Examiner* — Gary Graham
(74) *Attorney, Agent, or Firm* — Robert L. Stearns; Dickinson Wright, PLLC (57) ABSTRACT

A windscreen wiper device includes an elastic, elongated carrier element, as well as an elongated wiper blade, which can be placed in abutment with a windscreen to be wiped. The wiper blade includes an upper holding part holding at least one longitudinal strip of the carrier element disposed in at least one longitudinal groove of the upper holding part, as well as a lower wiping part, which windscreen wiper device includes a connecting device for an oscillating arm. The oscillating arm is pivotally connected to a rod of the connecting device about a pivot axis near one end thereof, with the interposition of a joint part, wherein the connecting device includes limitation means for limiting the maximum rotation angle of the pivotal movement of the oscillating arm.

13 Claims, 6 Drawing Sheets

(56) References Cited

FOREIGN PATENT DOCUMENTS

| JP | 2005-75050 | * | 3/2005 |
| WO | 0108950 A1 | | 2/2001 |
| WO | 0234591 A | | 5/2002 |
| WO | 03084791 A1 | | 10/2003 |
| WO | WO2008/148615 | * | 12/2008 |

* cited by examiner

WINDSCREEN WIPER DEVICE

BACKGROUND OF THE INVENTION

1. Technical Field

The present invention relates to a windscreen wiper device comprising an elastic, elongated carrier element, as well as an elongated wiper blade, which can be placed in abutment with a windscreen to be wiped, which wiper blade consists of an upper holding part holding at least one longitudinal strip of the carrier element disposed in at least one longitudinal groove of the upper holding part, as well as a lower wiping part, which windscreen wiper device comprises a connecting device for an oscillating arm, wherein the oscillating arm is pivotally connected to a rod of the connecting device about a pivot axis near one end thereof, with the interposition of a joint part.

2. Related Art

Such a windscreen wiper device is generally known. This prior art windscreen wiper device is designed as a so-called "flat blade" or "yokeless blade", wherein no use is made of several yokes pivotally connected to each other, but wherein the wiper blade is biased by the carrier element, as a result of which it exhibits a specific curvature. In use, the known wiper device is in a position in which the oscillating arm is extending substantially parallel to the windscreen. In service, for example for cleaning or replacing the wiper blade, the wiper device can be put in a position in which the arm is extending away from the windscreen. In this service position, the connecting device and the wiper blade attached to the connecting device are able to rotate around the arm for about 180 [deg.] around the pivot axis. If the wiper device is put back into its use position while the wiper blade is rotated more than 90 [deg.] from its use position, the wiper blade will not touch the windscreen with its lower wiping part, but with the upper holding part. This can cause damage to the windscreen and/or the wiper device, especially when the wiper device is put back into its use position with relatively large force.

SUMMARY OF THE INVENTION

It is an object of the invention to obviate these disadvantages, in the sense that a windscreen wiper device is presented that facilitates efficient and/or easy cleaning and/or replacement of the wiper blade while reducing the chance of damaging the windscreen and/or the wiper device.

In order to accomplish that objective, a windscreen wiper device of the kind referred to in the introduction is characterized in that the connecting device comprises limitation means for limiting the maximum rotation angle of the pivotal movement of the oscillating arm. Preferably the maximum rotation angle is in the range of 30 to 90 [deg.], more preferably in the range of 40 to 70 [deg.]and even more preferably 45 to 55 [deg.]. Because of the limitation of the maximum rotation angle of the pivotal movement of the oscillating arm the cleaning or replacing of the wiper blade can easily be performed when the wiper device is in service position, while it is not possible to put the wiper device back in use position with the upper holding part facing the windscreen. An advantage of having the limitation means only on the connecting device is that the joint part and the wiper arm can be standard parts.

In a preferred embodiment of a windscreen wiper device according to the invention the limitation means comprise at least one protrusion extending downwardly from the rod near a wall of the connecting device. Preferably, the protrusion is located on the inner part of the wall, so that the protrusion cannot be seen from the outside when the joint part and the oscillating part are in place. This has the advantage that the external appearance of the connecting device does not change.

In another preferred embodiment of a windscreen wiper device according to the invention at least one wall of the connecting device comprises parts of increased wall thickness. The parts of increased wall thickness have the advantage that (plastic) deformation of the connecting device is avoided. Preferably the parts of increased wall thickness are located on the inner parts of the walls, which has the advantage that the external appearance of the connecting device does not change.

In another preferred embodiment of a windscreen wiper device according to the invention the rod comprises a longitudinal protrusion extending downwardly over at least apart of the length of the rod. This protrusion has the advantage that it extends towards the wiper arm so that, even when a pressure is exerted by the wiper arm and the joint part on the connecting device, the joint part stays fixed to the connecting device.

THE DRAWINGS

The invention will now be explained in more detail with reference to figures illustrated in a drawing, wherein.

DETAILED DESCRIPTION

Figure 1:
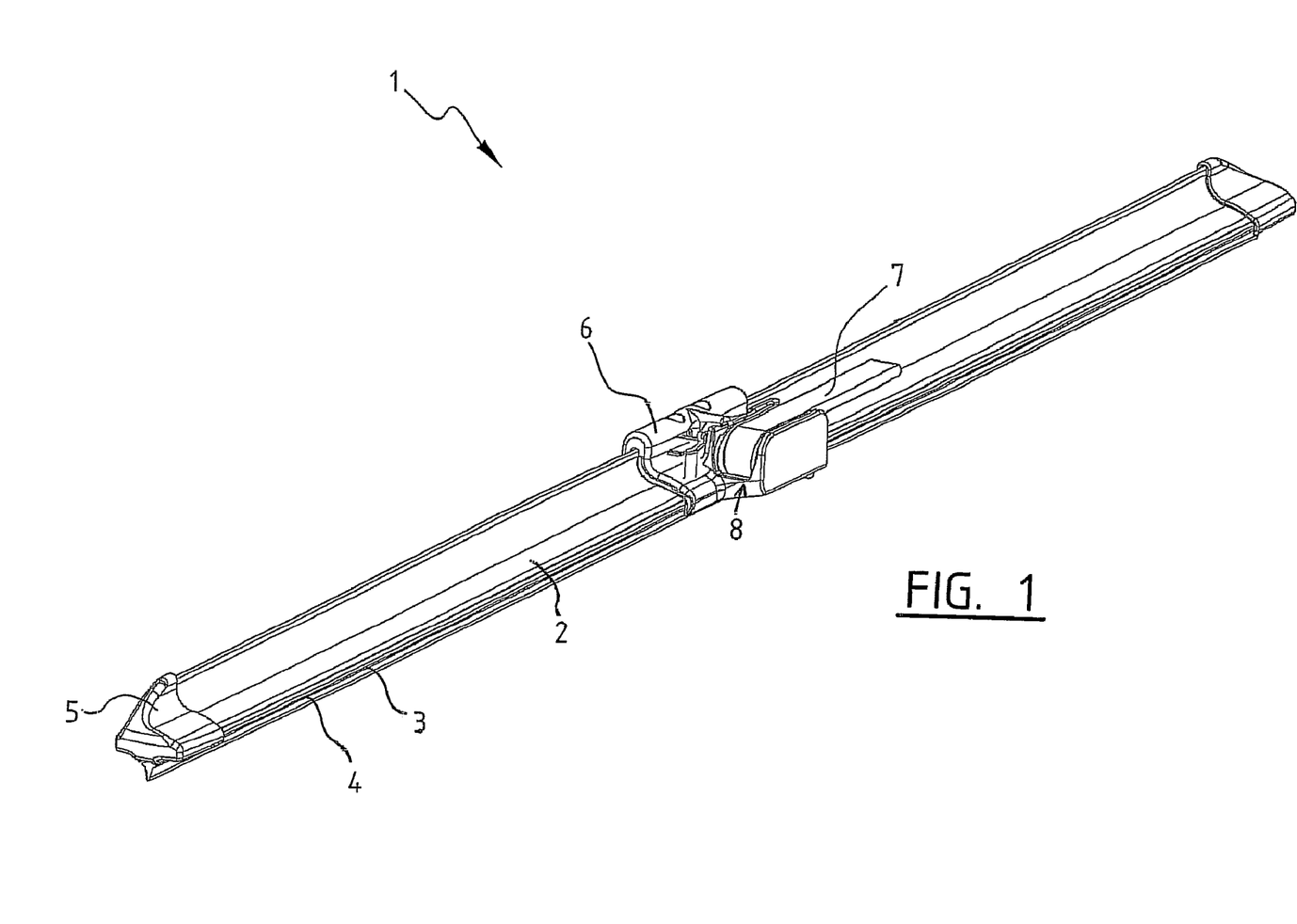
FIG. 1 is a perspective view of a windscreen wiper device according to the invention.

FIG. 1 shows a windscreen wiper device 1 built up of an elastomeric wiper blade 2 comprising longitudinal grooves 3, wherein longitudinal strips 4 made of spring band steel are fitted in the longitudinal grooves 3. the strips 4 form a flexible carrier element for the rubber wiper blade 2, as it were, which is thus biased in a curved position (the curvature in operative position being that of a windscreen to be wiped). Neighbouring ends of the strips 4 (not shown) are interconnected on either side of the windscreen wiper device 1 to respective connecting pieces or "end caps" 5. The connecting pieces 5 could be separate constructional elements, which may be form-locked ("positive locking" or "having a positive fit") as well as force-locked to the ends of the strips 4. In another preferred variant, the connecting pieces 5 are in one piece with the strips 4 made of spring band steel. The windscreen wiper device 1 is furthermore built up of a connecting device 6 for connecting an oscillating wiper arm 7 thereto, with the interposition of a joint part 8. The connecting device 6 can be made of a plastic material or metal, such as steel or aluminum. The oscillating wiper arm 7 is pivotally connected to the connecting device 6 about a pivot axis near one end.

Figure 2:
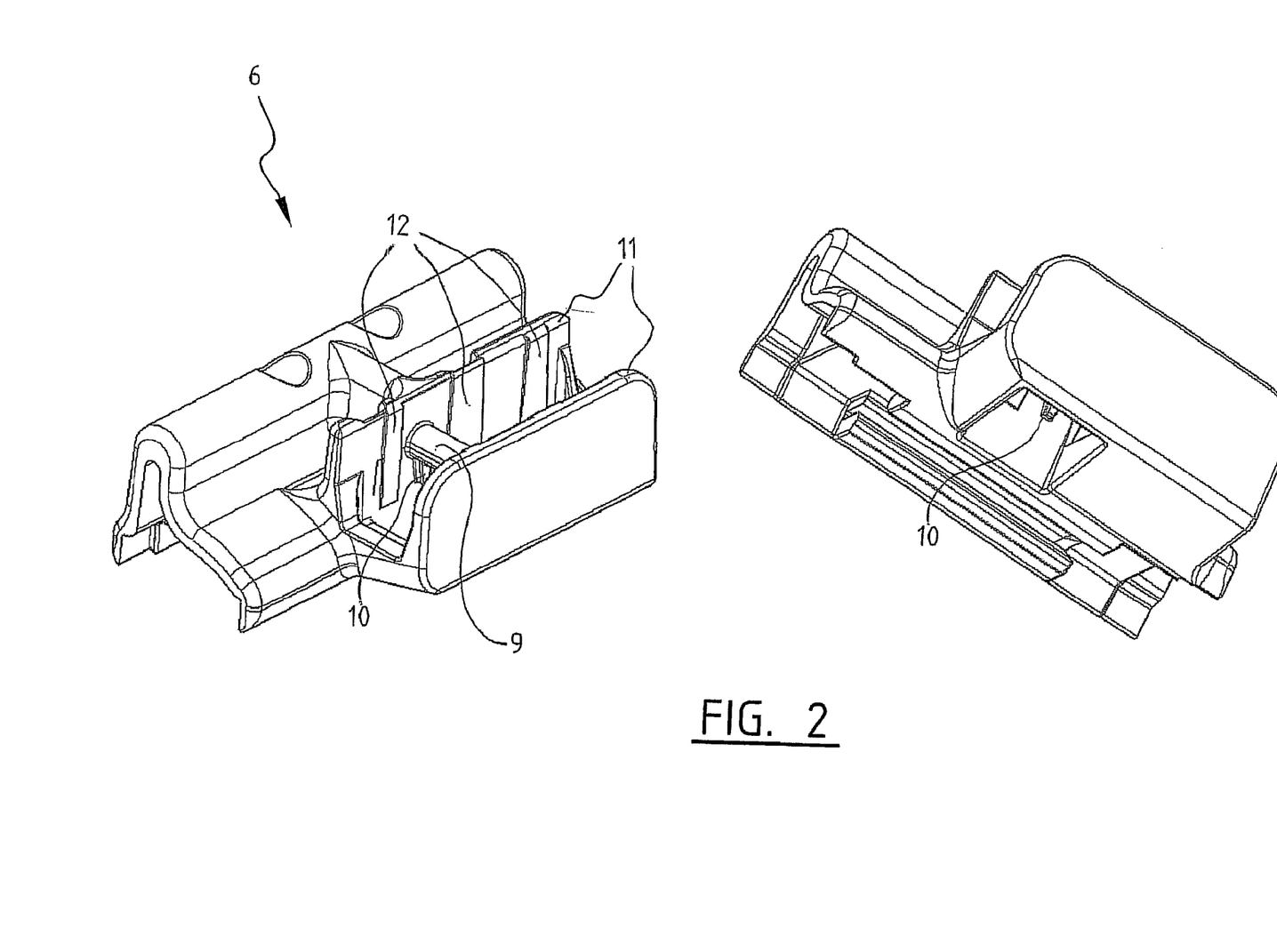
FIG. 2 is a perspective view of a preferred embodiment of a connecting device according to the invention.

FIG. 2 shows the connecting device 6 which comprises a rod 9 that corresponds to the pivot axis and to which the oscillating wiper arm 7 can be pivotally connected. To limit the maximum rotation angle of the oscillating wiper arm, the rod 9 comprises a protrusion 10 extending downwardly from the rod 9 near a wall 11 of the connecting device 6. The downward direction can also be defined as the direction facing toward the windscreen when the wiper device is in use position. As can be seen in FIG. 2, the protrusion 10 for limiting the maximum rotation angle is located on the inner part of wall 11. This has the advantage that it cannot be seen when the joint part and the oscillating arm are in place so that the external appearance of the connecting device does not change. In FIG. 2 it is also shown that wall 11 comprises parts 12 of increased wall thickness. This increased wall thickness will avoid (plastic) deformation of the connecting device 6. As can be seen the parts 12 of increased wall thickness are located on the inner parts of the wall where the joint part and the oscillating arm are placed. This has the advantage that the external appearance of the connection device does not change. Instead of one protrusion 10, the rod 9 can comprise two protrusions 10, wherein the first protrusion extends downwards near a first wall 11 and wherein the second protrusion extends downwards near the second wall 11.

Figure 3:
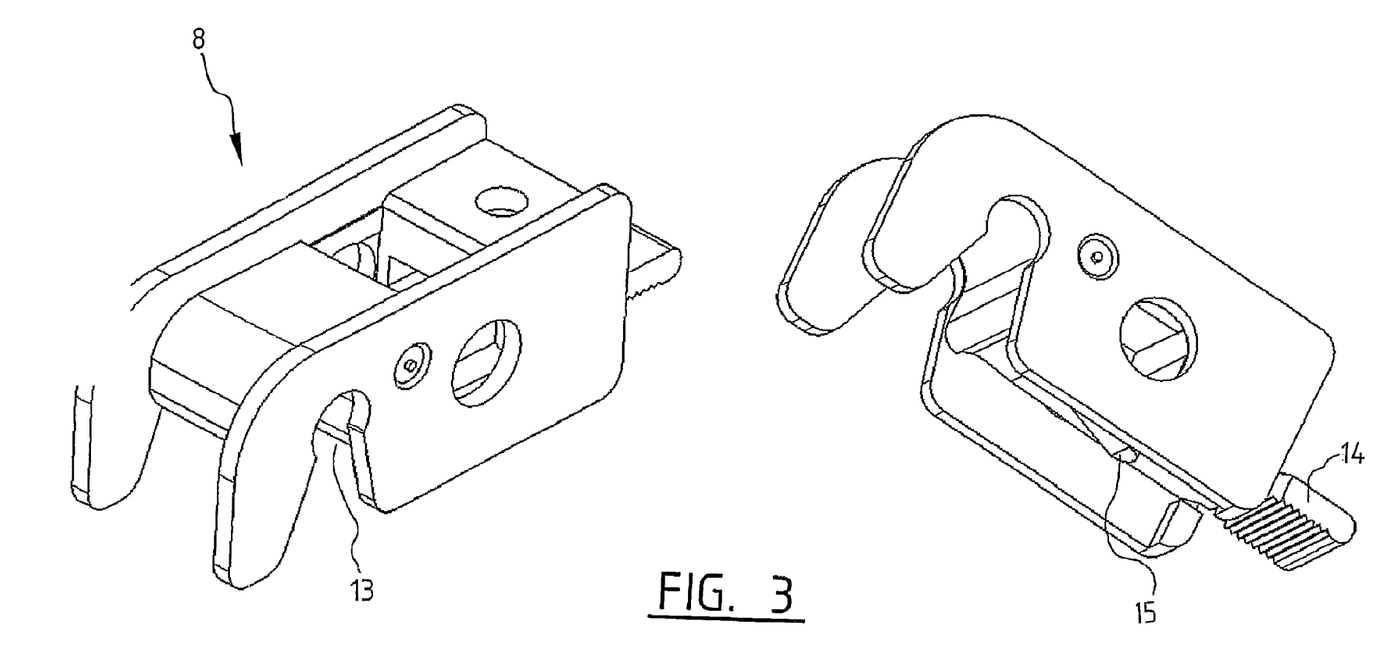
FIG. 3 is a perspective view of a joint part.

FIG. 3 shows the joint part 8 with an opening 13 which is adapted for receiving rod 9 of the connecting device 6. Joint part 8 further comprises a resilient tongue 14 comprising a downwardly extending protrusion 15. the downwardly extending protrusion 15 is adapted to engage in hole 16 of an oscillating arm 7 (FIG. 4).

Figure 4:
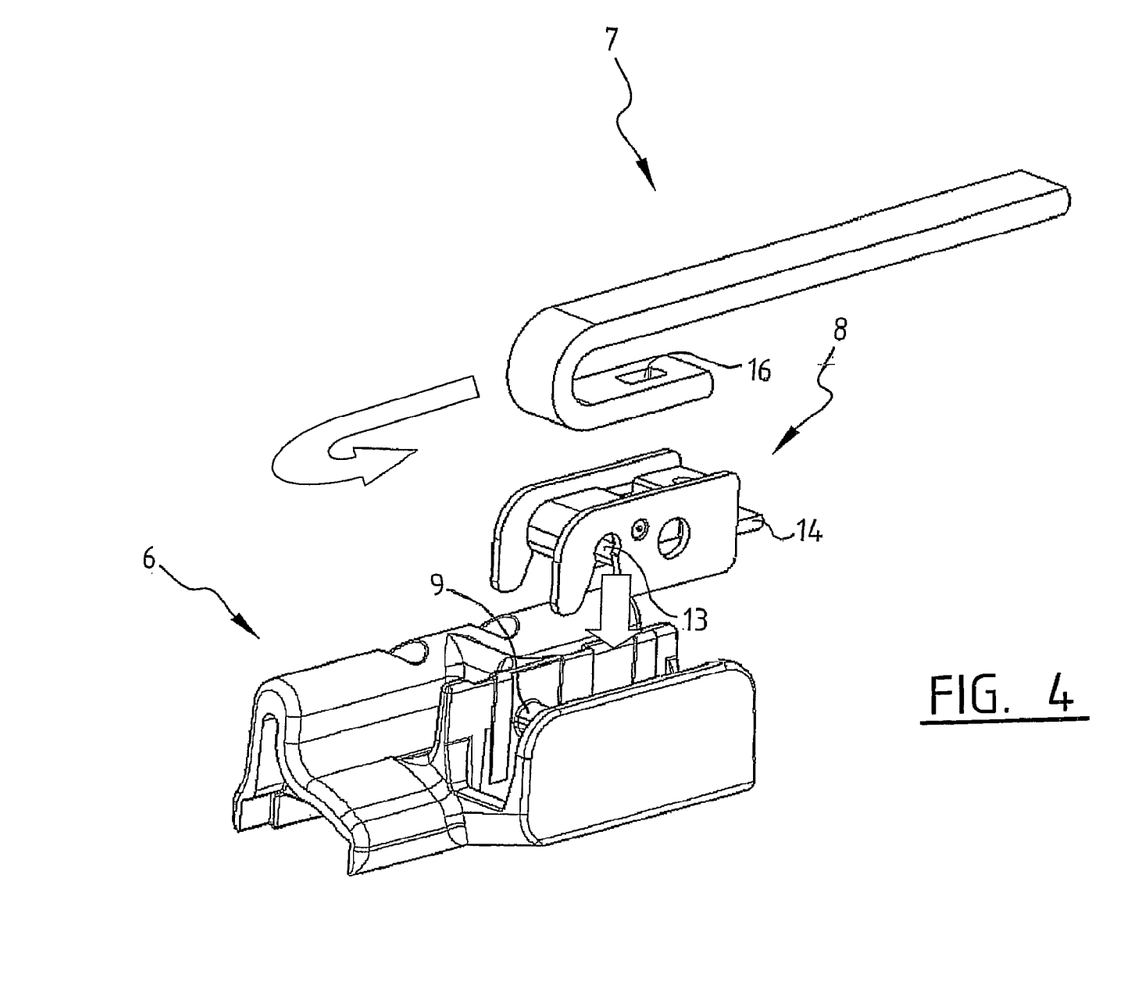
FIG. 4 is a perspective view of the fixation process of the wiper arm on the joint part and the joint part on the connecting device.

FIG. 4 shows that the joint part 8 can be clipped on rod of connecting device 6 with use of opening 13. The oscillating wiper arm 7 with hole 16 can be slidably connected to joint part 8. During this sliding movement the resilient tongue 14 is initially pushed in against a spring force and then allowed to spring back into the hole 16, thus snapping, that is clipping the protrusion 15 into the hole 17.

Figure 5:
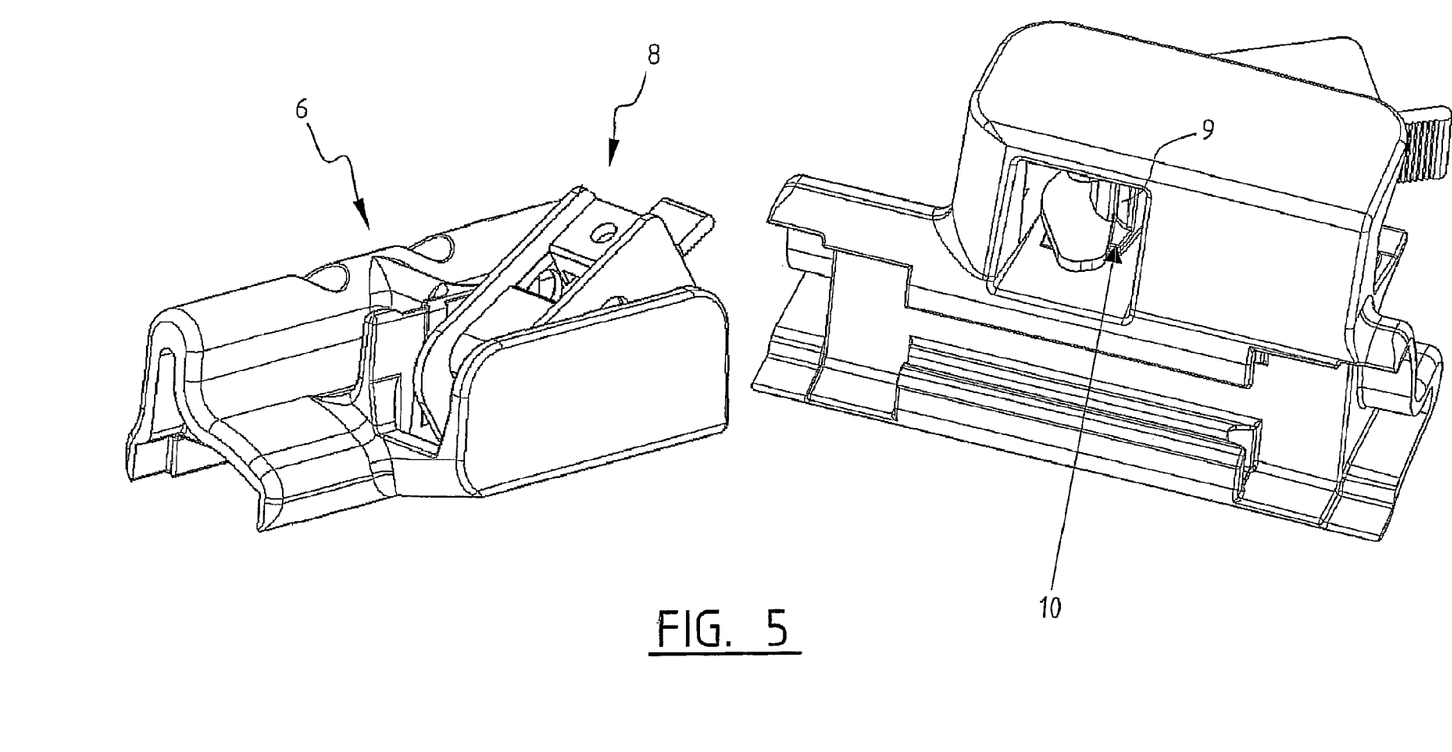
FIG. 5 is a perspective view of the joint part fixed on the connecting device according to the invention.

FIG. 5 shows the pivoting movement of the joint part 8 about the rod 9 of connecting device 6. It is seen that protrusion 10 extending downwardly from rod 9 stops the pivoting movement at a maximum rotation angle of approximately 45 [deg.].

Figure 6:
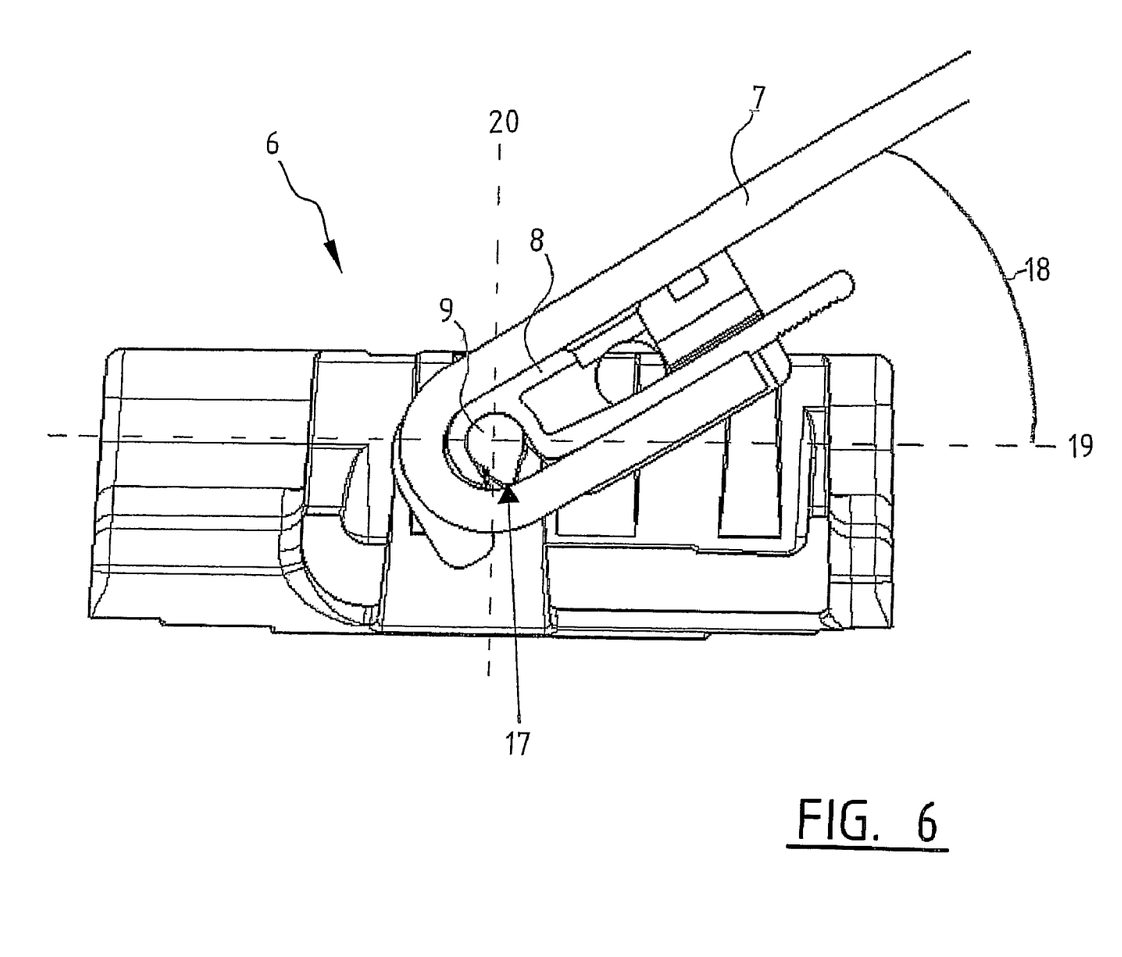
FIG. 6 is a cross section of the wiper arm, the joint part and another preferred embodiment of the connecting device according to the invention.

FIG. 6 shows a cross section of another preferred embodiment of the connecting device 6 together with the joint part 8 and the oscillating wiper arm 7. In this figure it is seen that rod 9 comprises a longitudinal protrusion 17 extending downwardly over the length of the rod 9 between the two walls 11 of the connecting device 6. It can be seen that the downwardly extending protrusion 17 is located slightly of the central transverse axis 20 of the connecting device 6 in a direction in which the wiper arm 7 extends. Further it can be seen that the protrusion 17 extends towards the wiper arm 7, which has the advantage that, even when a pressure is exerted by the wiper aim 7 and joint part 8 on the protrusions 10 of the connecting device 6, the joint part stays fixed to the connecting device 6. In FIG. 6 the maximum rotation angle 18 of the pivotal movement of the oscillating arm can be seen. As can be seen this maximum rotation angle 18 is defined as the angle between the wiper arm 7 and the middle longitudinal axis 19 of the connecting device 6.

The invention is not restricted to the variants shown in the drawing, but it also extends to other preferred embodiments that fall within the scope of the appended claims.

The invention claimed is:

1. A windscreen wiper device comprising an elastic, elongated carrier element, as well as an elongated wiper bade, which can be placed in abutment with a windscreen to be wiped, which wiper blade includes an upper holding part holding at least one longitudinal strip of the carrier element disposed in at least one longitudinal groove of said upper holding part, as well as a lower wiping part, which windscreen wiper device comprise a connecting device for an oscillating arm, wherein said oscillating arm is pivotally connected to a rod of said connecting device about a pivot axis near one end thereof, with the interposition of a joint part which has an opening with a neck that is resiliently flexible to snappingly engage with said rod of said connecting device, wherein said rod of said connecting device comprises a rotation limiter for limiting the maximum rotation angle of the pivotal movement of the oscillating arm.

2. The windscreen wiper device according to claim 1, wherein the maximum rotation angle is in the range of 30 to 90°.

3. The windscreen wiper device according to claim 1, wherein the maximum rotation angle is in the range of 40 to 70°.

4. The windscreen wiper device according to claim 1, wherein the maximum rotation angle is in the range of 45 to 55°.

5. A windscreen wiper device comprising an elastic, elongated carrier element, as well as an elongated wiper bade, which can be placed in abutment with a windscreen to be wiped, which wiper blade includes an upper holding part holding at least one longitudinal strip of the carrier element disposed in at least one longitudinal groove of said upper holding part, as well as a lower wiping part, which windscreen wiper device comprise a connecting device for an oscillating arm, wherein said oscillating arm is pivotally connected to a rod of said connecting device about a pivot axis near one end thereof, with the interposition of a joint part which has an opening with a neck that is resiliently flexible to snappingly engage with said rod of said connecting device, wherein said connecting device comprises limitation means for limiting the maximum rotation angle of the pivotal movement of the oscillating arm, and wherein the limitation means comprise at least one protrusion extending downwardly from the rod near a wall of the connecting device.

6. The windscreen wiper device according to claim 5, wherein at least one wall of the connecting device comprises parts of increased wall thickness.

7. A windscreen wiper device comprising an elastic, elongated carrier element, as well as an elongated wiper bade, which can be placed in abutment with a windscreen to be wiped, which wiper blade includes an upper holding part holding at least one longitudinal strip of the carrier element disposed in at least one longitudinal groove of said upper holding part, as well as a lower wiping part, which windscreen wiper device comprise a connecting device for an oscillating arm, wherein said oscillating arm is pivotally connected to a rod of said connecting device about a pivot axis near one end thereof, with the interposition of a joint part which has an opening with a neck that is resiliently flexible to snappingly engage with said rod of said connecting device, wherein said connecting device comprises limitation means for limiting the maximum rotation angle of the pivotal movement of the oscillating arm, and wherein the rod includes a longitudinal protrusion extending downwardly over at least a part of the length of the rod.

8. A windscreen wiper assembly, comprising:
   a wiper blade;
   a carrier supporting said wiper blade and biasing said wiper blade into a curved position;
   a connecting device disposed on said carrier for enabling attachment with a wiper arm, said connecting device having a pivot rod and a joint part pivotally coupled to said rod for relative pivotal movement, said joint part including an opening with a neck that is resiliently flexible to snappingly receive said joint part into said pivotal engagement with said pivot rod; and said pivot rod of said connecting device including at least one abutment projecting into said opening of said joint part when snappingly engaged with onto said rod and confronting said joint part to limit the maximum angle of said pivotal movement of said joint part.

9. The windscreen wiper assembly of claim 8, wherein said maximum angle is between 30 to 90 degrees.

10. The windscreen wiper assembly of claim 8, wherein the maximum angle is between 40 to 70 degrees.

11. The windscreen wiper assembly of claim 8, wherein the maximum angle is between 45 to 55 degrees.

12. The windscreen wiper assembly of claim 8, wherein said abutment extends from said rod.

13. The windscreen wiper assembly of claim 8, wherein said abutment engages at least one edge of said opening of said joint part.

* * * * *